(12) United States Patent
Lackey

(10) Patent No.: US 8,049,667 B2
(45) Date of Patent: Nov. 1, 2011

(54) GPS ANTENNA ARRAY AND SYSTEM FOR ADAPTIVELY SUPPRESSING MULTIPLE INTERFERING SIGNALS IN AZIMUTH AND ELEVATION

(75) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 424 days.

(21) Appl. No.: 12/378,607

(22) Filed: Feb. 18, 2009

(65) Prior Publication Data

US 2010/0207811 A1 Aug. 19, 2010

(51) Int. Cl.
*H01Q 3/00* (2006.01)

(52) U.S. Cl. ........................................................ 342/368

(58) Field of Classification Search .................... 342/368
See application file for complete search history.

(56) References Cited

U.S. PATENT DOCUMENTS

| | | | |
|---|---|---|---|
| 2,217,911 A | 10/1940 | Lindenblad | |
| 5,311,194 A | 5/1994 | Brown | |
| 5,361,212 A | 11/1994 | Class et al. | |
| 5,534,882 A * | 7/1996 | Lopez | 343/891 |
| 6,201,510 B1 * | 3/2001 | Lopez et al. | 343/799 |
| 6,246,369 B1 | 6/2001 | Brown et al. | |
| 6,300,915 B1 * | 10/2001 | Lopez | 343/813 |
| 6,618,016 B1 * | 9/2003 | Hannan et al. | 343/705 |
| 6,819,291 B1 | 11/2004 | Lackey et al. | |
| 7,417,597 B1 * | 8/2008 | Lopez | 343/799 |
| 2010/0117914 A1 * | 5/2010 | Feller et al. | 343/757 |

OTHER PUBLICATIONS

A. Monteiro, A Parasitic Lindenblad Antenna for 70cm, AMSAT Proceedings (2006).
R. A. Monzingo, et al., Introduction to Adaptive Arrays, Scitech Publishing, Inc. (2004), pp. 6-8 and 260-266.
B. Pattan, Robust Modulation Methods & Smart Antennas in Wireless Communications, Prentice Hall PTR (2000), pp. 241-250.

* cited by examiner

*Primary Examiner* — Thomas Tarcza
*Assistant Examiner* — Frank McGue
(74) *Attorney, Agent, or Firm* — Leo Zucker

(57) ABSTRACT

An antenna system has N antenna units stacked on a mast. Each unit has elements for responding to, e.g., GPS signals, and a phasing network that produces mutually orthogonal primary and auxiliary pattern modes at corresponding mode ports of the unit. A number of power dividers are each associated with a different mode, and each divider has N input ports coupled to the associated mode port of a corresponding antenna unit. The power divider associated with the primary pattern mode produces a reference beam and an auxiliary beam, and remaining power dividers produce different auxiliary beams. All beams have approximately both a common phase center and a common group delay center. An adaptive processor combines the reference and selected auxiliary beams to obtain a composite antenna reception pattern in which nulls are inserted at certain angles to suppress interfering signals, without degrading authentic signals arriving at other angles.

18 Claims, 12 Drawing Sheets

MFN Input/Output Ports Relative Phase

| Input/Output | 1 | 2 | 3 | 4 | 5 | 6 | 7 | 8 |
|---|---|---|---|---|---|---|---|---|
| H | 0 | 0 | 0 | 0 | 0 | 0 | 0 | 0 |
| B | 0 | -45 | -90 | -135 | -180 | -225 | -270 | -315 |
| D | 0 | 45 | 90 | 135 | 180 | 225 | 270 | 315 |
| E | 0 | -90 | -180 | -270 | 0 | -90 | -180 | -270 |
| F | 0 | 90 | 180 | 270 | 0 | 90 | 180 | 270 |
| C | 0 | -135 | -270 | -45 | -180 | -315 | -90 | -225 |
| A | 0 | 135 | 270 | 45 | 180 | 315 | 90 | 225 |
| G | 0 | 180 | 0 | 180 | 0 | 180 | 0 | 180 |

GPS ANTENNA ARRAY AND SYSTEM FOR ADAPTIVELY SUPPRESSING MULTIPLE INTERFERING SIGNALS IN AZIMUTH AND ELEVATION

BACKGROUND OF THE INVENTION

1. Field of the Invention

This invention relates to antennas, particularly a GPS antenna operative to null or suppress reception of interfering signals.

2. Discussion of the Known Art

The Global Positioning System (GPS) is a navigation system featuring a constellation of 24 satellites that traverse six circular orbits around the Earth twice a day, with four satellites in each orbit. The satellites transmit coded L-band microwave radio frequency (RF) signals, and are always positioned so that signals from at least four of the satellites can be received at any point on Earth.

Specifically, each GPS satellite presently transmits its signals using two RF carrier frequencies, viz., 1575.42 MHZ (referred to as "L1") and 1227.60 MHZ ("L2"). A third frequency of 1176.45 MHZ ("L5") has also been allocated for civilian use in 2009. The L1 signal is modulated by two different spread spectrum codes, namely, an unclassified coarse acquisition (C/A) code intended for use in commercial civil navigation equipment, and a Y code that is modulated on the L1 carrier in quadrature with the C/A code and with half the power of the C/A code. The Y code is a product of an unclassified P (precise) code, and a classified W code. The C/A and the P codes are unique for each satellite. The satellite antennas are configured so that the GPS signals have a right-hand circular polarization (RHCP) as they propagate toward the Earth.

Basically, a GPS receiver compares time data as encoded on a signal received from a given satellite, with a local time at which the signal was received. The time difference is then used to calculate the distance between the receiver and the transmitting satellite. Using calculated distances from at least three satellites, the receiver determines its position on Earth by known triangulation techniques. With four or more satellites in view, the receiver can determine its altitude as well. Once the receiver's position is determined, it may calculate other information such as speed, bearing, and distance to a given destination.

The transmitted signals are subject to degradation by several factors including, inter alia, signal multipath which occurs when a GPS signal reflects off of objects such as buildings or other tall surfaces before reaching the receiver. The calculated distance to the transmitting satellite based on a reflected GPS signal will be greater than the actual line of sight distance, thus causing error in the position determined by the receiver. Other degrading factors may include receiver clock errors, orbital (ephemeris) errors, number of satellites visible (the fewer satellites in view, the lower the accuracy), and the relative positions of the satellites at any given time (accuracy degrades when the satellites are spaced angularly close to one another as seen from the receiver). In a tactical or military environment, intentional jamming is another factor that must be overcome to maintain GPS receiver accuracy.

Differential GPS (DGPS) is a system that operates to correct errors which may exist in GPS signals as they are being received in a certain geographical area, wherein a base station in the area transmits certain correction data to other GPS receivers in the area which, in turn, use the data to increase the accuracy of position and other information they derive from the GPS signals. DGPS has been adopted to assist in the landing of aircraft on ground airport runways as well as on decks of aircraft carriers. For example, U.S. Pat. No. 5,361,212 (Nov. 1, 1994) discloses a DGPS landing assistance system wherein a ground station in the vicinity of a landing strip includes a GPS receiver, and a transmitter for sending data to an approaching aircraft over a wireless data link. The transmitted data includes GPS correction data and a global position of two points that define a desired aircraft glide path associated with the landing strip. Equipment aboard the aircraft includes a GPS receiver, a separate data link receiver for receiving the correction data and the global position of the points defining the glide path, and a computer for determining a corrected global position of the aircraft along with lateral and vertical deviations of the aircraft from the glide path. See also, U.S. Pat. No. 5,311,194 (May 10, 1994), which discloses a GPS precision aircraft approach and landing system wherein the transmitted correction data is modulated on an L-band carrier or "pseudolite" signal that is synchronized with GPS time by way of a GPS timing signal. Both of the mentioned '212 and '194 U.S. patents are incorporated by reference.

For greatest accuracy and safety, a ground station or aircraft carrier in a DGPS landing system deploys so-called reference antennas that are configured to respond optimally to the right-hand circularly polarized (RHCP) signals from the GPS satellites, and to supply the signals to GPS receivers and correction data generating equipment at the station or aboard the carrier. Due to the complex physical and electromagnetic environment of an aircraft carrier, as many as three or more precision GPS reference antennas may need to be installed at determined locations on the carrier so that accurate position correction and other critical data can be determined and transmitted to approaching aircraft or other landing platforms.

To avoid position offset errors, each reference antenna must have a well-defined phase center, and introduce known carrier phase and code phase delays into signals arriving at any given angle of the antenna's reception pattern. The phase center of a GPS receiving antenna is defined as the precise point whose position is being measured in response to GPS signals incident on the antenna. The location of the phase center may vary with the direction of arrival of a given GPS signal mainly as a function of satellite elevation, while azimuth effects may be introduced locally by the environment around the antenna. Thus, it will be understood that ignoring variations in the phase center of a GPS receiving antenna can lead to serious errors in position measurement. See, e.g., G. L. Mader, GPS Antenna Calibration at the National Geodetic Survey, at –http://www.ngs.noaa.gov/ANTCAL/images/summary.html=; F. Czopek, et al., Calibrating Antenna Phase Centers, GPS World (May 2002); and A. Boussaad, et al., A Tale of Two Methods, GPS World (February 2005).

Carrier phase delay is a delay induced on a received GPS signal at its carrier frequency, while code phase delay is a delay induced on the signal over the signal's bandwidth. An ideal GPS right-hand circular polarization reference antenna should have a carrier phase progression of one degree of carrier phase delay per degree of azimuth arrival angle, and remain constant relative to elevation at any given azimuth angle. The antenna should also have a constant code phase delay with angle. Accordingly, ground and ship based reference antennas for DGPS assisted aircraft approach and landing guidance must perform within strict electrical tolerances.

As mentioned, GPS reference antennas are subject to unintentional (lateral and sea multipath) and intentional (jamming) interference which can adversely affect approach and landing guidance. Conventional adaptive array techniques may be employed to form a null in the reception pattern of a given antenna array at an angle that coincides with that of an interfering signal. See, e.g., R. A. Monzingo, et al., Introduction to Adaptive Arrays, Scitech Publishing, Inc. (2004), at pages 6-8 and 260-66; and B. Pattan, Robust Modulation Methods & Smart Antennas in Wireless Communications, Prentice Hall PTR (2000), at pages 241-50. In DGPS applications, the known techniques can act to degrade the overall precision of the system, however. For example, the array's code (group) phase delay and carrier phase delay may be modulated independently for each satellite signal when certain offset elements of a GPS antenna array are weighted and combined. Also, if the array dimensions are too small, it becomes difficult to break the null sharply; that is, the reception pattern stays attenuated over a relatively large angle away from the desired angle of the null. Thus, authentic GPS signals arriving at angles near but not identical to that of the interfering signal go undetected. A reference antenna that suppresses interference without degrading system performance for GPS signals arriving in directions other than that of the interfering signal(s), is therefore highly desirable.

U.S. Pat. No. 5,534,882 (Jul. 9, 1996), incorporated by reference, discloses a GPS antenna comprised of a number of radiator or antenna units stacked one above the other along a vertical support or mast. Each element array includes four dipoles supported in a circular array about the mast, wherein the feed points of the dipoles lie in a horizontal plane and are spaced circumferentially by 90 degrees from one another. Each dipole of a given antenna unit is oriented broadside to the radial direction, and its feed point is aligned vertically with respect to the feed points of corresponding dipoles of the other units. The arms of each dipole are also inclined at a 45 degree angle with respect to the horizontal.

The dipoles of each antenna unit have their feed points coupled with transmission lines that introduce certain progressive phase delays to the dipoles. Also, the dipoles of units above and below a center or reference unit on the mast, have associated phase delays that are offset by, e.g., minus 90 and plus 90 degrees, respectively, from the phase delays associated with the corresponding dipoles of the reference unit. Signals from all the transmission lines are combined to produce an overall reception pattern for the antenna that is optimally responsive to right hand circularly polarized GPS signals arriving from slightly above the horizon (zero degrees) to zenith (90 degrees) in elevation, but which suppresses all signals arriving at or below the horizon, e.g., lateral and ground or sea multipath reflections.

U.S. Pat. No. 6,201,510, also incorporated by reference, discloses a self-contained, four dipole antenna unit with a progressive phase omni-directional (PPO) network that introduces phase delays that increase in 90 degree increments for each dipole. The patent also discloses a GPS antenna including (i) one of the units disposed centrally along the length a vertical antenna mast, (ii) an upper set of ten of the units stacked on the mast above the central unit, and (iii) a lower set of ten of the units stacked on the mast below the central unit. All of the units are spaced from one another along the mast by approximately one-half the operating wavelength. Significantly, the antenna has a unitary phase center for avoiding errors in position determinations, as well as a uniform group delay.

The PPO network associated with the central antenna unit is connected via a transmission line (coaxial cable) to a signal combiner. The unit disposed immediately above the central unit, i.e., the first of the upper ten units, and every odd numbered unit beyond in the upward direction, are also connected by transmission lines to the signal combiner. Further, the unit disposed immediately below the central unit, i.e., the first of the lower ten units, and every odd numbered unit beyond in the downward direction, are connected by transmission lines to the signal combiner. Thus, 11 of the PPO networks (that of the central antenna unit, five of the upper set of units and five of the lower set) are connected to the signal combiner via transmission lines all of which are preferably of equal length. The remaining PPO networks of the upper and the lower sets of units are not connected to the combiner and are simply terminated. The GPS antenna of the '510 patent has a right-hand circularly polarized GPS reception pattern with uniform gain from slightly above the horizon to zenith in elevation, and a sharp cutoff at and below the horizon. As mentioned, the antenna has a unitary phase center as well as uniform group delay.

A compact GPS aircraft antenna whose reception pattern may be adapted when necessary to null or suppress jamming signals arriving from a given azimuth direction, is disclosed in U.S. Pat. No. 6,618,016 (Sep. 9, 2003) which is incorporated by reference. The antenna is in the form of a rectangular cavity about five inches square by one and one-half inches high, with a sheet metal lower surface, conductive peripheral side and interior partition walls, and an upper surface including a printed circuit board. Four slot elements are formed in the upper surface and extend radially from a central vertical axis at 90 degree intervals in the plane of the upper surface. In addition, four bent monopole elements project above the upper surface in a circular array, wherein each monopole element is disposed between a pair of the slot elements and faces broadside to the radial direction.

Each of the slot and the monopole elements has an associated feed point that connects with a corresponding input port of a coupling assembly. The four input ports associated with the slot elements of the antenna connect directly with four output ports of the coupling assembly, and the four input ports associated with the monopole elements connect with a beam forming network contained in the coupling assembly. The beam forming network provides an additional four output ports of the coupling assembly. As disclosed, the antenna of the '016 patent is capable of forming eight different reception patterns depending on which output port of the coupling assembly is processed. A primary beam pattern available at one of the output ports provides omnidirectional (360 degree azimuth) RHCP hemispherical (zero to 90 degree elevation) coverage. The remaining seven patterns including a clover leaf and slot element patterns at four different angular positions, are also available at the output ports and may be combined to form nulls in the antenna's primary beam pattern where and when needed.

Another airborne GPS antenna suitable for anti-jam adaptive processing is disclosed in U.S. Pat. No. 6,819,291 (Nov. 16, 2004), also incorporated by reference. The antenna of the '291 patent features eight monopole elements mounted in a circular configuration above a ground plane with equal circumferential spacing of 45 degrees from one another. Including a protective radome, the overall dimensions of the antenna are about 3.75 inches in diameter by less than two inches height. The antenna includes an orthogonal excitation or coupling network having eight element ports each of which connects to a different monopole element via a transmission line, and eight mode ports (numbered I to VIII in the patent) each representing a different reception pattern for the antenna with respect to incident signals arriving at various angles.

Mode I provides a 45 degree counter clockwise (CCW) progressive phase (PP) coupling of the monopole elements to yield a first omnidirectional RHCP hemispherical or "primary" reception pattern for the antenna. Mode II provides a 45 degree clockwise (CW) PP coupling of the monopole elements to yield a second omnidirectional LHCP hemispherical pattern. Modes III and IV provide 90 degree CCW and CW PP coupling, respectively. Modes V and VI provide 135 degree CCW and CW coupling, respectively. Mode VII provides 180 PP coupling to yield an eight lobe reception pattern for the antenna, and mode VIII provides same phase coupling for all the monopole elements to obtain a uniform phase omnidirectional pattern. Like the antenna of the '016 patent, the antenna of the '291 patent together with the disclosed excitation network can obtain a primary reception pattern (mode 1) allowing omnidirectional RHCP hemispherical coverage in elevation, and the remaining seven or "auxiliary" modes may be combined to effect appropriate nulls in the antenna's primary reception pattern when jamming signals are detected, using known adaptive array processing techniques.

U.S. Pat. No. 7,417,597 (Aug. 26, 2008), incorporated by reference, discloses a GPS antenna having a vertical mast, with 13 four-dipole element arrays stacked vertically on the mast. Each element array is identical or similar to the element arrays disclosed in the mentioned '510 U.S. patent, and includes a progressive phase omnidirectional (PPO) network coupled between a common feed port and each of the four dipoles of the array. Counting from the lowermost element array on the mast, the second, fourth, sixth, seventh, eighth, tenth and twelfth arrays are designated as primary radiator units, and the remaining arrays are designated as auxiliary radiator units. Outputs from the feed ports of the primary radiator units are individually weighted and input to a first signal combiner, and outputs from the feed ports of the auxiliary radiator units are individually weighted and input to a second signal combiner. Outputs from the two signal combiners are then subtractively combined by an adjustable signal combiner under the control of an adaptive control system.

The control system is operative to steer a single, omnidirectional null in the antenna's reception pattern so as to suppress an interfering signal arriving at an elevation angle between minus eight and plus five degrees relative to the horizon. In the event multiple interfering signals are detected at different elevation angles, the null may be steered to a determined angle between the interferers, but such a solution is not effective to eliminate all potential errors attributable to the interferers.

The patented GPS ground antennas described above are in the form of vertical collinear arrays of individual antenna units that are phased to produce primary reception patterns that are hemispherical above the horizon, and which cut off at and below the horizon with low side lobes. The phasing inherently suppresses ground and sea multipath. Lateral multipath is suppressed when the GPS satellites are at low elevation angles due to the right hand circular polarization of the antennas. That is, reflections of GPS signals off of ship structures including tall aircraft, as well as off of the water, will acquire a left hand circular polarization which is orthogonal to the right hand circular polarization of the primary reception pattern of the antennas. The antennas are also constructed so as to have point group and phase delay centers that closely coincide with the group and the phase delay centers of the auxiliary radiator units of the antennas so that the centers are preserved during adaptive processing, and precision approach and landing guidance is maintained in the presence of interference and jamming.

The GPS antenna of the mentioned '597 U.S. patent enables a single null to be steered in a low elevation plane of the antenna's reception pattern for jamming rejection. More complex threats in the form of multiple jammers each at differing elevation angles of arrival may exist, however. Such threats require an ability to induce discrete nulls in the antenna's pattern at multiple angles of azimuth and elevation. Thus, there is a need for a GPS antenna that will enable discrete azimuthal nulls to be steered to suppress interfering signals arriving near the horizon but at different elevation angles. There is also a need for a GPS antenna that will enable multiple nulls to be induced in its reception pattern at any elevation angle above the horizon.

SUMMARY OF THE INVENTION

According to the invention, an antenna system includes a mast, and a number of antenna units fixed along the mast with a determined spacing. Each antenna unit has a number of antenna elements disposed about a periphery of the unit for responding to radio frequency (RF) signals within a certain wavelength band, and a phasing network coupled to the elements. The phasing network is configured to produce a primary pattern mode at a primary mode port of the antenna unit, and one or more auxiliary pattern modes at corresponding mode ports of the unit, all modes being mutually orthogonal.

A number of power dividers are each associated with a different mode port of the antenna units, and each power divider has a number of input ports each of which is coupled to the associated mode port of a different antenna unit. The power divider coupled to the primary mode ports of the antenna units is configured to produce a reference beam at a reference port of the divider and, optionally, a low-elevation auxiliary beam at an auxiliary port of the divider. The power dividers coupled to the auxiliary mode ports of the antenna units produce corresponding low-elevation auxiliary beams at corresponding auxiliary ports of the dividers. An adaptive processor coupled to the reference and the auxiliary ports of the power dividers processes the reference and the auxiliary beams to obtain a desired reception pattern for the antenna system.

In the disclosed embodiment, the adaptive processor combines the reference and selected low-elevation auxiliary beams adaptively with one another to produce a null in the reception pattern of the antenna system at one or more determined angles in azimuth and in elevation, to suppress multiple interfering signals without degrading authentic signals at other angles of the reception pattern.

According to another aspect of the invention, a collinear antenna array has a mast arranged to be fixed at a certain position with respect to a surrounding ground area, and to extend vertically above the ground area. A number of antenna units are fixed along the length of the mast with a determined spacing from one another. Each antenna unit includes a number of antenna elements disposed about the periphery of the unit for responding to radio frequency (RF) signals within a certain wavelength band, and an associated phasing network coupled to the elements. The phasing network is configured to produce a number of mutually orthogonal pattern modes including a primary pattern mode at a primary mode port of the associated antenna unit, and one or more auxiliary pattern modes at corresponding auxiliary mode ports of the associated antenna unit.

For a better understanding of the invention, reference is made to the following description taken in conjunction with the accompanying drawing and the appended claims.

DETAILED DESCRIPTION OF THE INVENTION

Figure 1:
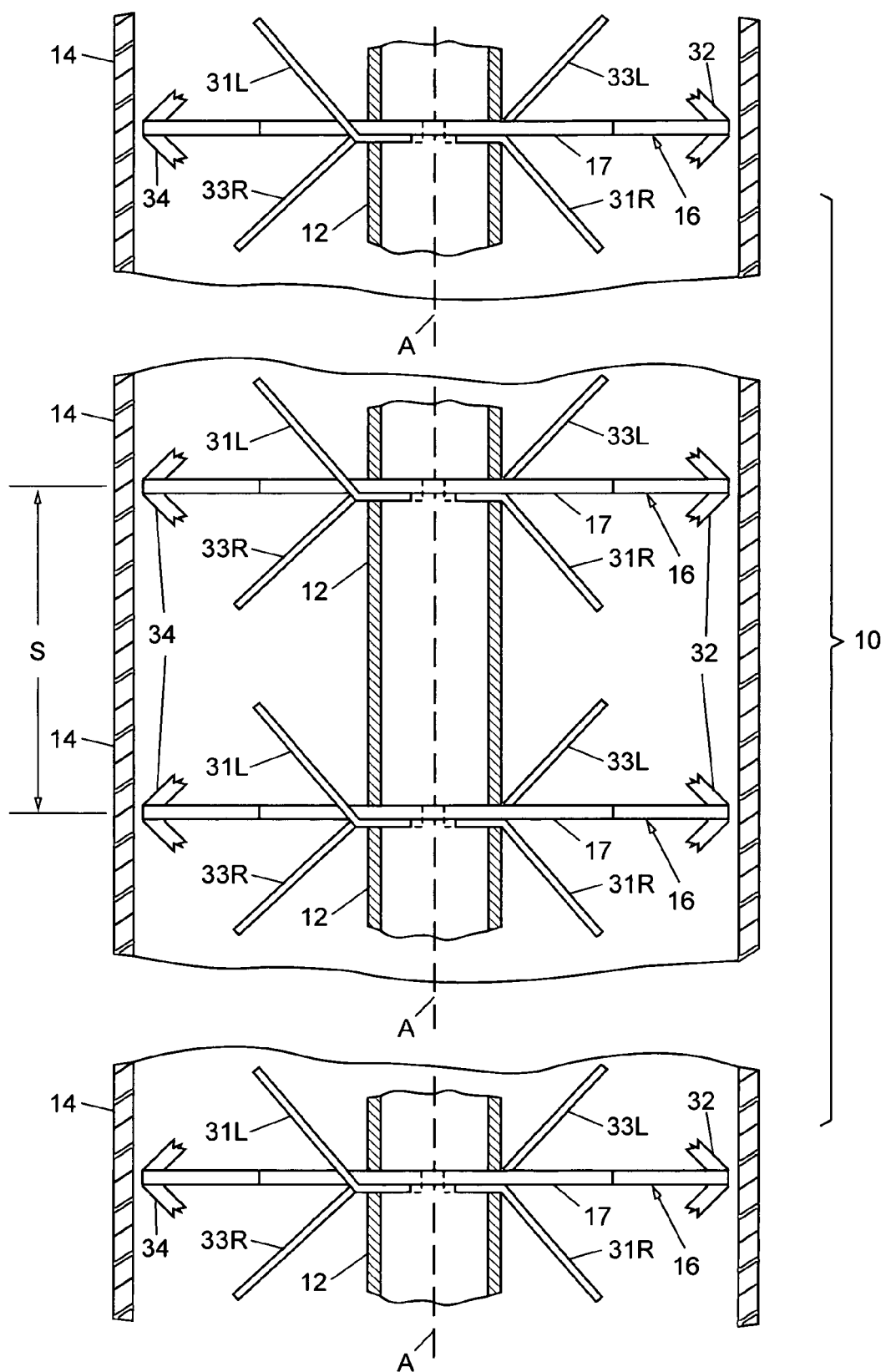
FIG. 1 is a partial view of a GPS antenna according to the invention, as seen in elevation and in cross section to show interior components of the antenna.

FIG. 1 is a partial view of an antenna 10 according to the invention. In the disclosed embodiment, antenna 10 is constructed and arranged for use as a reference antenna array in a differential global positioning system (DGPS). The antenna 10 includes a mast 12 having an axis A, and the mast is arranged to be fixed at one or more positions (not shown in FIG. 1) with respect to a surrounding ground area so that it can extend vertically above the area. The ground area may be located, for example, in the vicinity of a ground airport runway or a landing zone on an aircraft carrier.

The antenna 10 has an exterior protective shell or radome 14 which can be, e.g., circularly cylindrical in form with an axis that coincides with the axis A of the mast 12. Preferably, the material (typically a fiberglass reinforced plastics) and wall thickness of the radome 14 should have negligible, if any, effect on the amplitude and phase of GPS signals passing through the radome at all angles of the desired reception pattern of the antenna 10.

A number of radiator or antenna units 16 are fixed successively over the length of the mast 12 with a determined spacing S from one another, for example, S may be three inches, which is about 0.4 wavelengths at the frequency of the L1 GPS signals. In one arrangement well suited for GPS applications, a total of 13 of the antenna units 16 are disposed in a colinear array along the mast 12. As few as three and as many as 21 or more of the antenna units may be stacked on a single mast structure according to the needs of a particular system for which the antenna 10 may be deployed, however. Each antenna unit 16 includes a planar base 17 that is constructed and arranged to be supported perpendicular to the axis A of the mast 12, and four dipoles 31, 32, 33 and 34 that are mounted on the base 17 and disposed symmetrically about the periphery of the antenna unit. For GPS applications, the dipoles are dimensioned and configured to operate at the radio frequencies of GPS signals.

Figure 2:
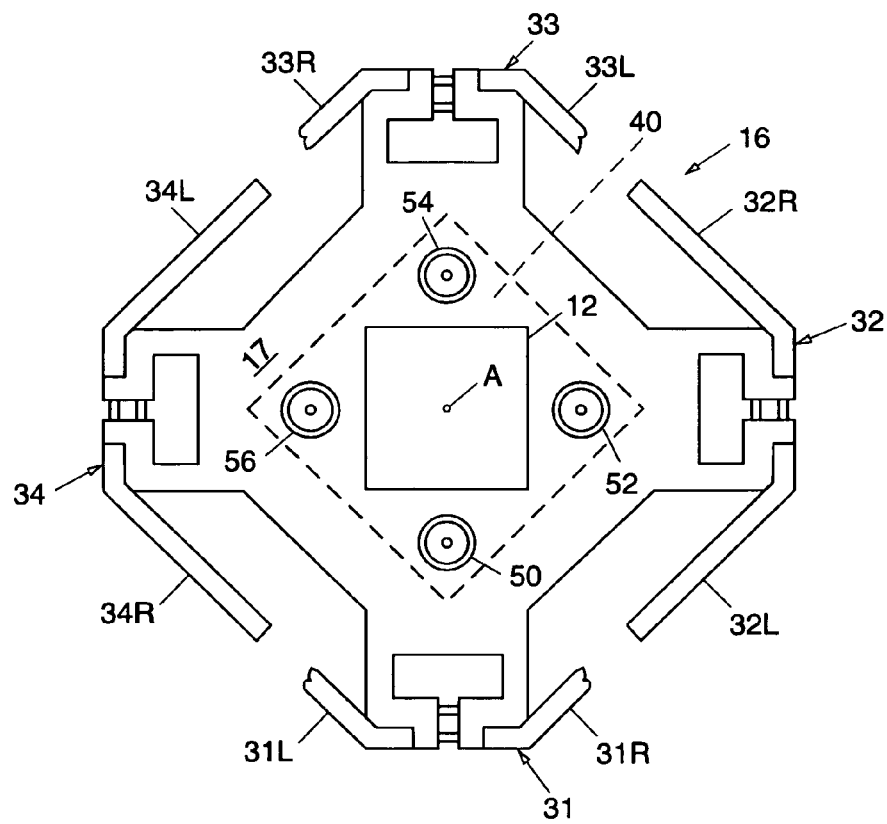
FIG. 2 is an enlarged plan view of one of a number of antenna units in the antenna of FIG. 1.

Each of the dipoles 31-34 may have the same form and be mounted in the same configuration on the base 17 as the dipoles of the four-dipole units disclosed in U.S. Pat. No. 6,201,510, noted earlier and incorporated by reference. When viewed broadside looking radially inward toward the mast 12, each dipole has a left arm mounted at one end to a feed point on the base 17 which arm tilts upward toward the left at a 45+ angle to the base, and a right arm mounted at one end to the feed point on the base and which tilts downward toward the right at a 45+ angle to the base. For example, dipole 31 which faces broadside to the viewer in FIG. 1 and is shown at the bottom of FIG. 2, has a left arm 31L that extends from the base 17 toward the left in FIGS. 1 and 2, and a right arm 31R that extends from the base toward the right in the drawing. In GPS applications, the left arms 31L-34L and the right arms 31R-34R of the dipoles are each about 1.75 inches in length, i.e., about one quarter wavelength at the frequency of the L1 GPS signals.

Figure 3:
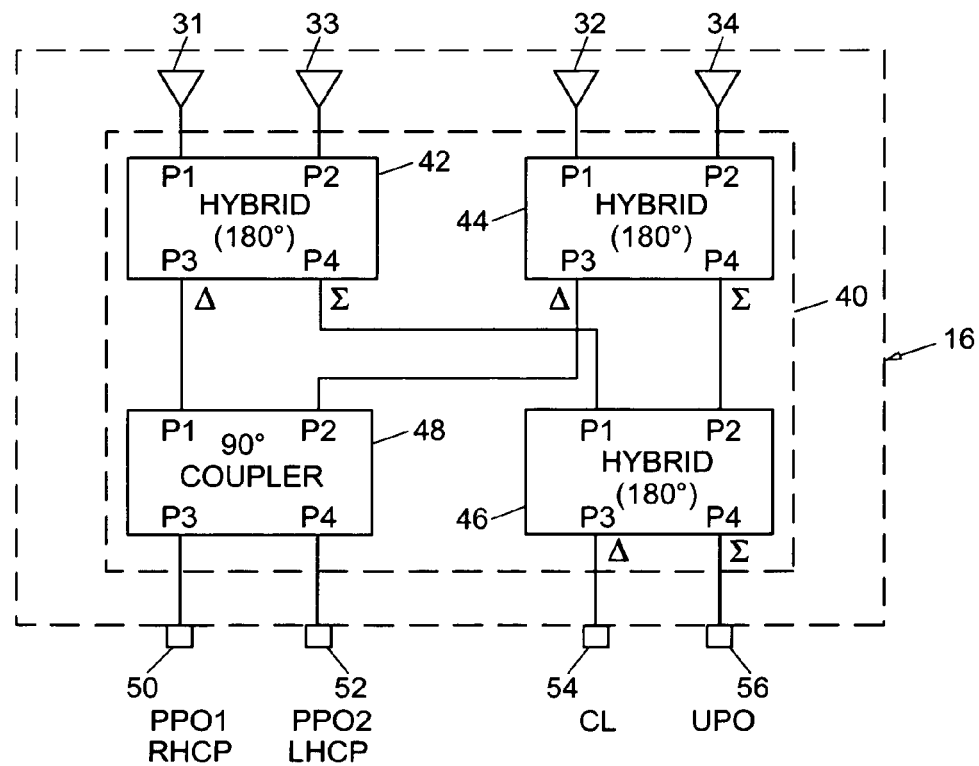
FIG. 3 is a schematic diagram of a phasing or mode forming network associated with each of the antenna units in FIG. 1.

Each antenna unit 16 also has an associated phasing network 40 that may be constructed, for example, in printed circuit form and adhered to or embedded within the unit base 17, as represented in FIG. 2. Components of the phasing network 40 are shown in FIG. 3, and include conventional four-port hybrid couplers 42, 44, 46, and 48 that can be realized using known microwave circuit fabrication methods. The couplers each have two input ports P1, P2 and two output ports P3, P4. For couplers 42, 44 and 46, output port P3 is marked Δ and it outputs a signal corresponding to a difference between input signals applied at the ports P1, P2, i.e., the phase of the signal at port P2 is delayed by 180 degrees with respect to the signal at port P1, and the signals then combine to produce the output at port P3. Output port P4 is marked Σ and it outputs a signal corresponding to a sum of the signals applied at input ports P1, P2, i.e., the signals at the input ports are combined in phase with one another to produce the output at port P4. Coupler 48 is a 90 degree hybrid coupler, wherein (i) the phase of the signal input at port P2 is delayed by 90 degrees with respect to the signal at port P1, and the signals then combine to produce the output at port P3, and (ii) the phase of the signal input at port P1 is delayed by 90 degrees with respect to the signal at port P2, and the signals then combine to produce the output at port P4.

As represented in FIG. 3, port P1 of the coupler 42 is coupled by a balanced transmission line to the feed point of dipole 31 of antenna unit 16, and port P2 is likewise coupled to dipole 33. Also, port P1 of the coupler 44 is coupled by a balanced transmission line to the feed point of dipole 32, and its port P2 is likewise coupled to dipole 34. Output port P3 of the 180+ coupler 42 is connected with input port P1 of the 90+ coupler 48, and output port P4 of coupler 42 is connected with input port P1 of the 180+ coupler 46. Also, output port P3 of coupler 44 is connected with input port P2 of 90+ coupler 48, and output port P4 of coupler 44 is connected with input port P2 of the 180+ coupler 46.

Phasing network 40 has four mode ports, viz., a primary mode port 50, and three auxiliary mode ports 52, 54 and 56, as shown in FIGS. 2 and 3. The mode ports may be in the form of, e.g., conventional circuit board or substrate mountable coaxial connectors, and are disposed at such locations on the antenna unit base 17 as to facilitate mating with connectors of corresponding cables that are routed inside the antenna 10 (see FIG. 6). Primary mode port 50 connects with output port P3 of the 90+ coupler 48 of phasing network 40, and corresponds to a 90 degree progressive phase omni-directional (PPO) right hand circular polarized (RHCP) primary pattern mode for the antenna unit 16. Auxiliary mode port 52 connects with output port P4 of coupler 48, and corresponds to a 90 degree PPO left-hand circular polarized (LHCP) auxiliary pattern mode for the antenna unit 16. Auxiliary mode port 54 connects with output port P3 of 180+ coupler 46 of phasing network 40, and corresponds to a cloverleaf (CL) auxiliary pattern mode for antenna unit 16, and auxiliary mode port 56 connects with output port P4 of coupler 46, and corresponds to a uniform phase omnidirectional (UPO) auxiliary pattern mode for the antenna unit. Note also that the four pattern modes are mutually orthogonal, that is, if any two of the patterns are multiplied by one another and the product is integrated over all space, the result will approach zero.

Figure 4:
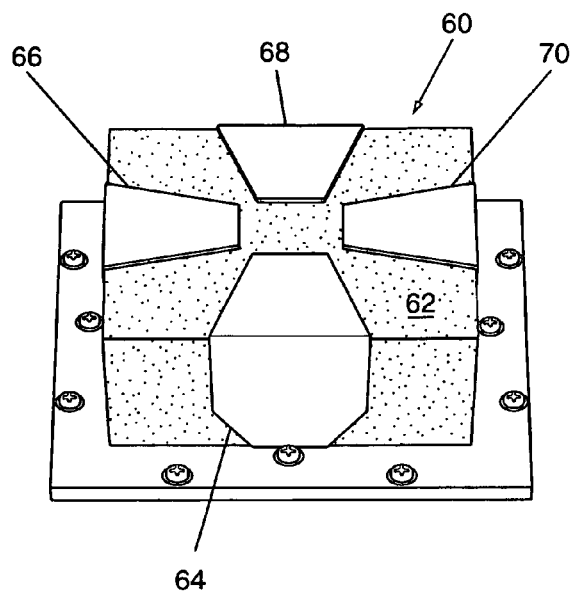
FIG. 4 is a perspective view of a first alternative antenna unit.

FIG. 4 shows an antenna unit 60 which, like the antenna units 16, has four antenna elements wherein four orthogonal pattern modes can be obtained. The antenna unit 60 includes a planar base 62, and four monopoles 64, 66, 68 and 70. The four monopoles may be configured the same as or similar to the monopole elements of the GPS aircraft antenna disclosed in U.S. Pat. No. 6,618,016 discussed above and incorporated by reference. The antenna unit 60 also has an integrated phasing network that is the same or similar in form and operation to the phasing network 40 in the antenna unit 16, wherein the phasing network of the unit 60 is coupled to each of the monopoles 64, 66, 68, 70 in order to obtain four mutually orthogonal pattern modes at corresponding mode port connectors on the unit base 62.

Figure 5:
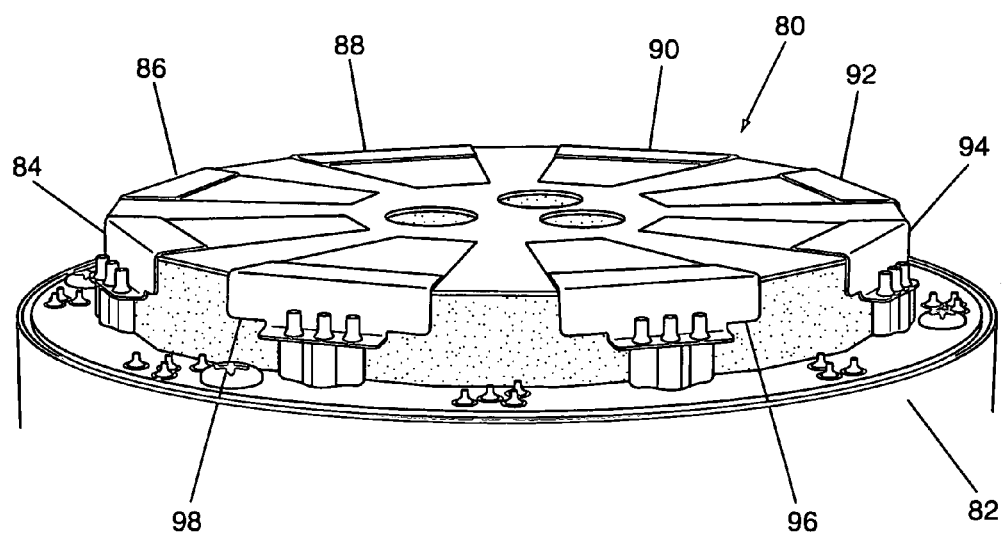
FIG. 5 is a perspective view of a second alternative antenna unit.
Figures 13, 14:
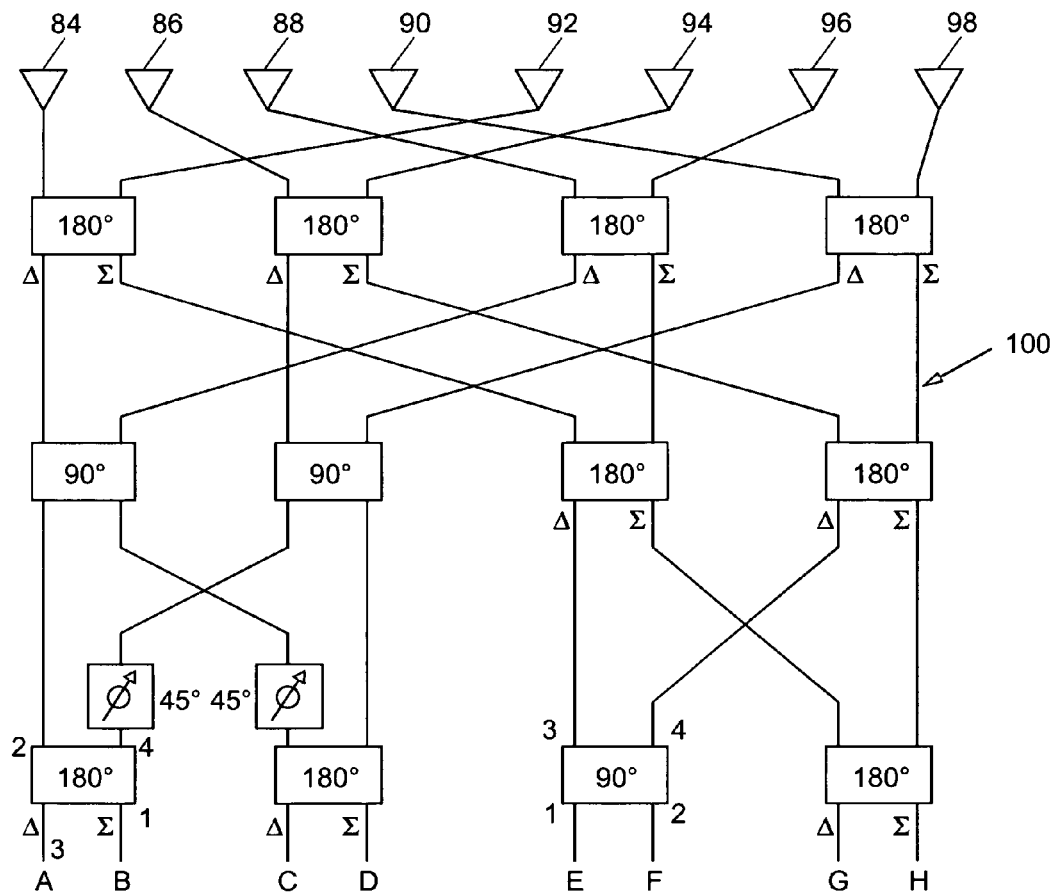
FIG. 13 is a schematic diagram of a mode forming network (MFN) for use with the antenna unit of FIG. 5.
FIG. 14 is a table showing phase delays introduced by the MFN of FIG. 13 to each of eight antenna elements of the unit of FIG. 5, to produce eight different pattern modes for the unit.

FIG. 5 shows an antenna unit 80 which can produce up to eight mutually orthogonal pattern modes as compared with the four modes from the antenna units 16 and 60, thus yielding increased degrees of freedom for adaptive nulling applications. The antenna unit 80 includes a planar base 82, and eight monopoles 84, 86, 88, 90, 92, 94, 96 and 98. The eight monopoles may be configured the same as or similar to the monopole elements of the GPS aircraft antenna disclosed in U.S. Pat. No. 6,819,291 discussed above and incorporated by reference. The antenna unit 80 also has an integrated phasing network such as shown in FIGS. 13 and 14, and described further below. The phasing network for the antenna unit 80 is coupled to each of the monopoles 84, 86, 88, 90, 92, 94, 96 and 98 in order to obtain the eight orthogonal pattern modes (see FIG. 14) each at a corresponding mode port connector on the unit base 82. For precision GPS applications, however, it is preferable to use an eight-dipole equivalent version of the antenna unit 80. Specifically, it has been discovered that centers of carrier phase and group delay in the pattern modes of the antenna units will coincide optimally when the antenna units are arranged in a uniform environment, that is, when the units are symmetrical both in their individual construction and their orientation relative to one another when stacked on the mast 12 as in FIGS. 1 and 2. For such performance, balanced dipole antenna elements are therefore preferred over monopoles. Also note that the arms of each of the dipoles 31-34 may be oriented vertically (i.e., parallel to the mast 12) and the antenna 10 may be deployed for nulling in systems using RF signals other than the RHCP L1 and L2 signals from the GPS satellites.

In the earlier mentioned U.S. Pat. No. 7,417,597, each of the antenna units (referred to as "sub-arrays" or "radiator units" in the '597 patent) has only one pattern mode, namely, a PPO RHCP mode that is output from a sole cable connector mounted on the base or substrate of each unit. The outputs of certain ones of the antenna units are weighted and combined to produce a primary beam pattern. Outputs of other units are weighted and combined to produce an auxiliary beam pattern. The auxiliary beam pattern is subtracted from the primary beam pattern to produce a controlled elevation null in the reception pattern of the antenna system at a desired low elevation angle, and the null extends over a full 360 degrees in azimuth due to the RHCP mode match of the auxiliary beam pattern with respect to the primary beam pattern.

By contrast, in the inventive antenna 10, the phasing networks in the antenna units produce multiple, preferably at least three, mutually orthogonal pattern modes for each unit, and each mode is initially processed independently. In the disclosed embodiment, two kinds of antenna patterns are obtained from the RHCP modes, namely, an upper hemisphere pattern having a sharp cutoff at ground level and coverage extending toward zenith, and a low elevation beam pattern. As used herein, "low elevation" means an angle of between approximately zero and ten degrees above the horizon, and "upper hemisphere" means all elevation angles above the horizon. In the disclosed embodiment, both the upper hemisphere pattern and a low elevation beam pattern are developed from the RHCP pattern modes of the antenna units 16, to correspond with the polarization of desired GPS signals. If other kinds of signals are desired to be received and have, e.g., a left-hand circular polarization, then the upper hemisphere pattern would be developed from the corresponding LHCP pattern modes of the antenna units. Additional, auxiliary beam patterns are also obtained from the other orthogonal pattern modes of the antenna units.

Figure 6:
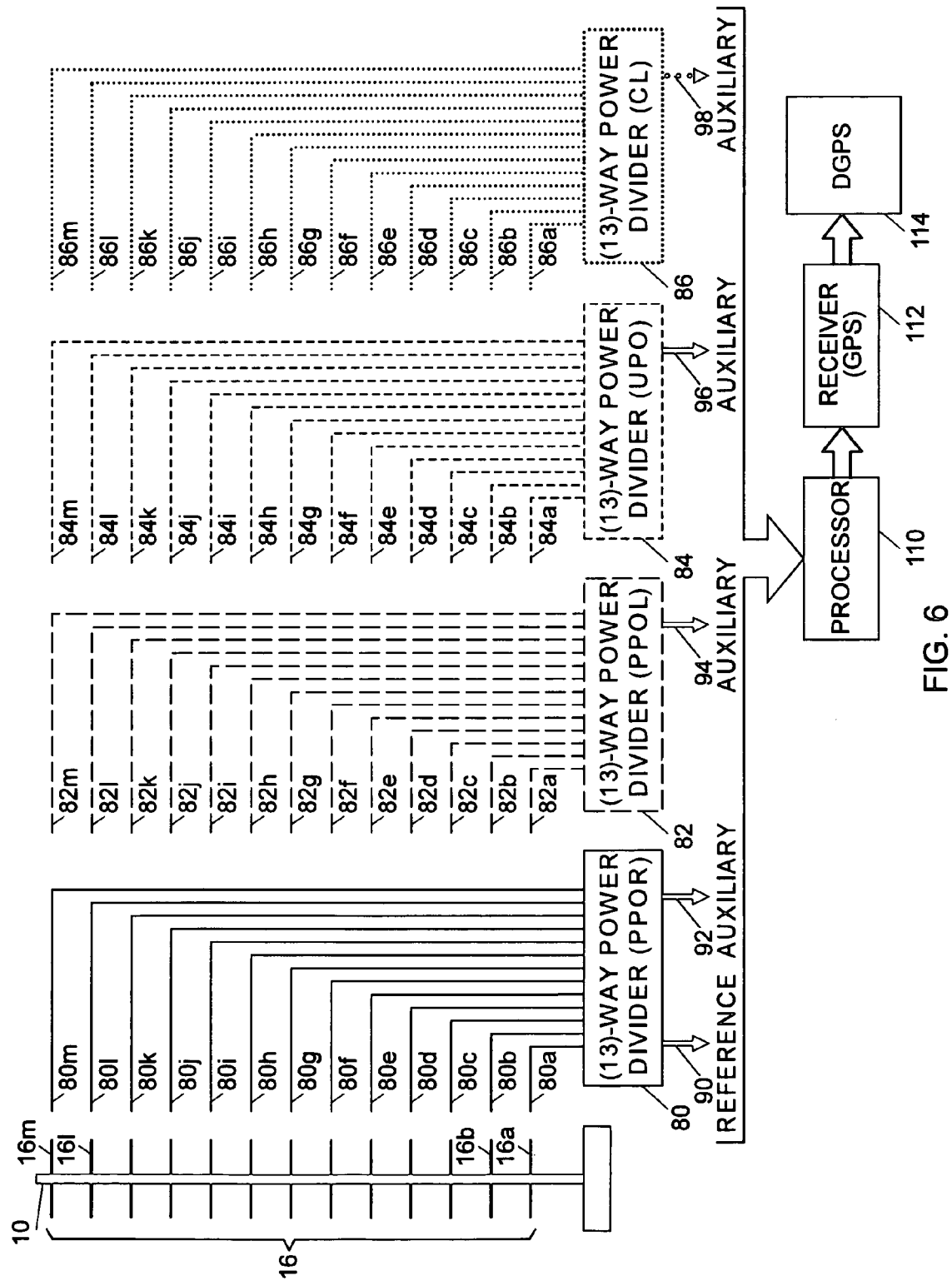
FIG. 6 is a block diagram showing a number of power dividers coupled to the antenna of FIG. 1, for obtaining a reference beam pattern and one or more auxiliary beam patterns, according to the invention.

In FIG. 6, only low elevation auxiliary beam patterns are developed from the other orthogonal modes, and those patterns are then adaptively combined with the reference beam pattern to produce a null in the antenna's overall reception pattern to suppress an interfering signal at a desired low elevation angle, wherein the null does not extend significantly beyond the azimuth angle of the interferer. GPS signals arriving at the same elevation angle, but at azimuth angles other than that of the interferer, may still be detected by the antenna 10. Also, because the antenna units 16 are substantially identical to one another in form and construction, their centers of phase and group delay all coincide, so reliable GPS position information will be obtained when the various modes output from the units are combined and processed to obtain desired nulls.

As mentioned, for GPS applications, the primary pattern mode for each antenna unit 16 is preferably a progressive phase omni-directional RHCP (PPOR) pattern. Three auxiliary modes also available from each unit 16 include a PPO LHCP (PPOL) pattern mode, a uniform phase omni-directional (UPO) pattern mode, and a four-lobe clover leaf (CL) pattern mode. Also, all four pattern modes are mutually orthogonal, and each mode has a different RF carrier phase progression in azimuth. Moreover, a total of eight orthogonal modes may also be obtained for GPS applications with an eight-dipole equivalent of the antenna unit 80 in FIG. 5.

The primary and the auxiliary pattern modes from the antenna units 16 are input to a corresponding number (e.g., four) of power dividers, each of which is associated with one of the mode ports of the antenna units. Each power divider is capable of combining the associated pattern modes output from the antenna units to produce an upper hemisphere pattern and a low-elevation auxiliary beam pattern, all patterns having approximately both a common phase center and a common group delay center by operation of the power dividers for minimal and traceable signal perturbation. The different azimuthal carrier phase progressions of the pattern modes of the antenna units, are also present in the upper hemispheric and the low elevation auxiliary beam patterns. The upper hemispheric pattern is further shaped by the mode response of the antenna units 16 and is different for each mode.

Selected ones of the low elevation auxiliary beam patterns are adaptively combined with the reference beam pattern to obtain an overall composite reception pattern for the antenna 10, which pattern can include multiple azimuthally independent nulls each at a different low elevation angle. The reception pattern will have little if any phase variation at higher elevation angles where authentic GPS satellite signals may still be received. This is because the levels of the sidelobes of the low elevation auxiliary beams at the higher elevation angles are relatively low, and the antenna's reception pattern is determined principally by the reference beam pattern alone at such angles. That is, the energy of the auxiliary beam patterns is focused in a low elevation region where interferers are most likely to be present. The multiple auxiliary beam patterns facilitate adaptive nulling of one or more interferers arriving at different low elevation angles and at different angles in azimuth, but they have minimal if any effect on the overall reception pattern of the antenna 10 over the remainder of space beyond the low elevation angles.

FIG. 6 is a diagram of a low elevation angle nulling configuration according to the invention, wherein four RF power dividers 80, 82, 84, and 86 are coupled by, e.g., coaxial cables routed axially inside the radome 14 of the antenna 10 to the antenna units 16 in order to produce the reference and the auxiliary beam patterns noted above. Each power divider is associated with a different one of the pattern modes of the antenna units 16. For example, power divider 80 is associated with the PPOR mode, divider 82 is associated with the PPOL mode, divider 84 is associated with the UPO mode, and divider 86 is associated with the CL mode.

Each of the power dividers 80-86 has a number of input ports, and each input port of a given divider is coupled to the associated mode port of a different antenna unit 16. For example, PPOR power divider 80 has 13 input ports 80a to 80m, and each input port is coupled to the PPOR mode port connector 50 (see FIGS. 2 & 3) on a corresponding one of the 13 antenna units 16 shown in FIG. 6. The PPOL power divider 82 has 13 input ports 82a to 82m, wherein each port is coupled to the PPOL mode port connector 52 on a corresponding antenna unit 16. The UPO power divider 84 has 13 input ports 84a to 84m, wherein each port is coupled to the UPO output connector 56 of a corresponding antenna unit 16, and CL power divider 86 also has 13 input ports 86a to 86m, each coupled to the CL output connector 54 of a corresponding antenna unit.

Figure 7:
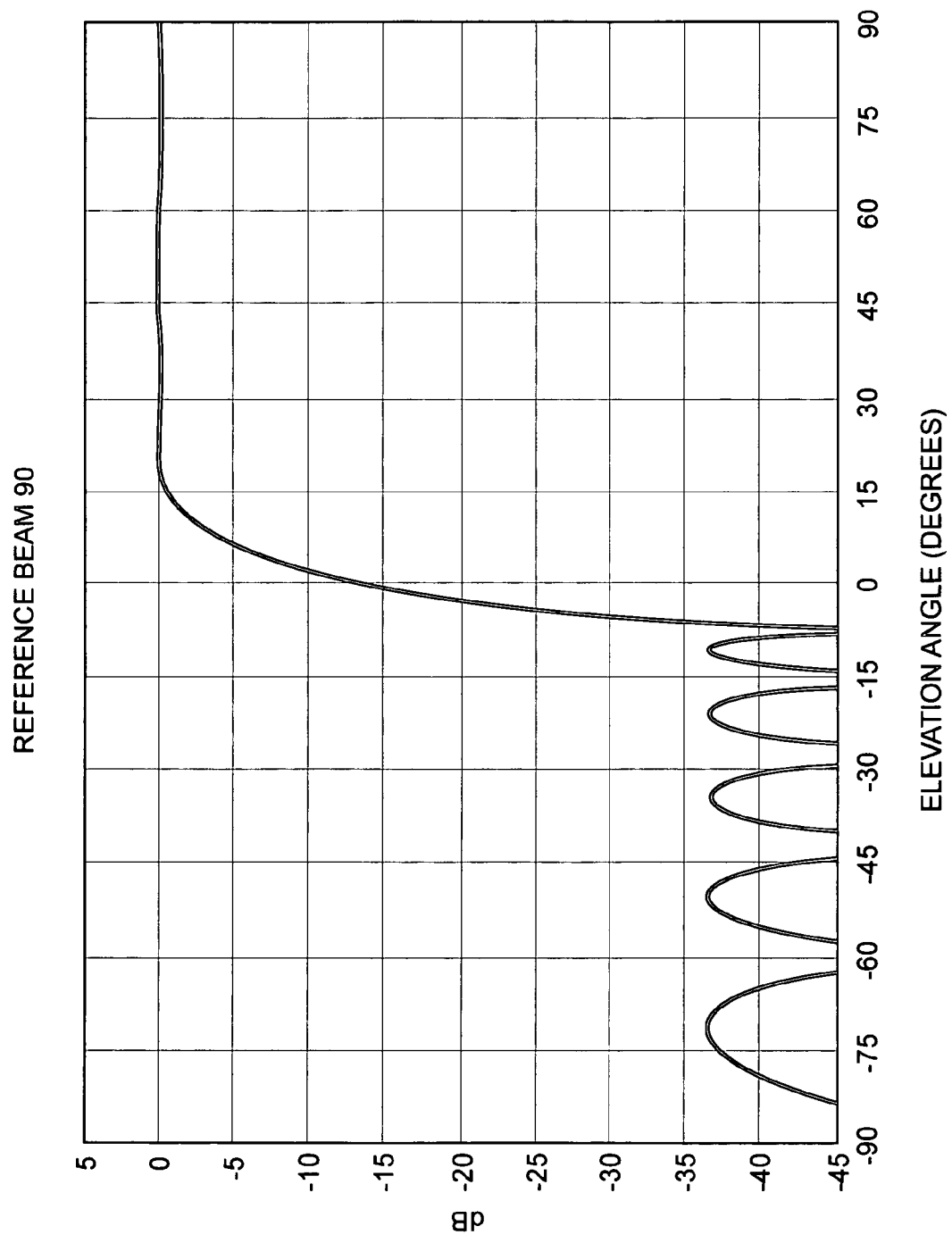
FIG. 7 is a graph representing a reference beam output of one of the power dividers in FIG. 6.
Figure 8:
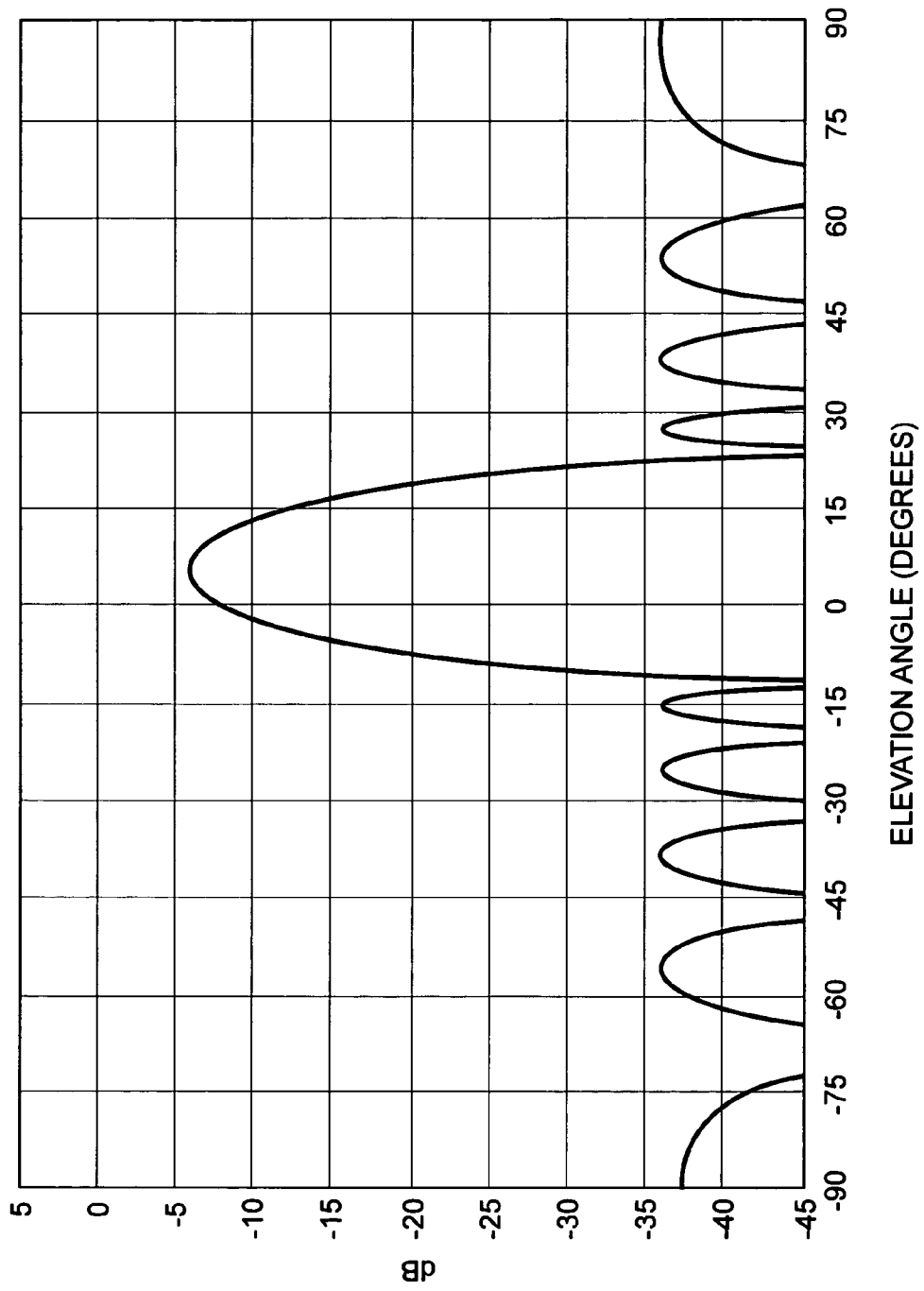
FIG. 8 is a graph representing an auxiliary beam output of one of the power dividers in FIG. 6.

In the embodiment of FIG. 6, the PPOR power divider 80 has a reference beam output 90 as shown in FIG. 7, and a first low-elevation auxiliary beam output 92 shown in FIG. 8. The other three power dividers 82, 84 and 86 each have corresponding second, third and fourth low-elevation auxiliary beam outputs 94, 96 and 98. The PPOR power divider 80 operates to produce the reference and the auxiliary beams 90, 92 by, for example, weighting and phasing each of the PPOR pattern modes output from individual antenna units 16a to 16m. See, for example, the signal weighting and phasing arrangement disclosed in FIGS. 10 & 11 and related text of the earlier mentioned U.S. Pat. No. 7,417,597, incorporated by reference. The other power dividers 82, 84, 86 produce the auxiliary beams 94, 96, 98 by similar operations, and all of the dividers 80-86 may be hard wired in a known manner.

Figure 9:
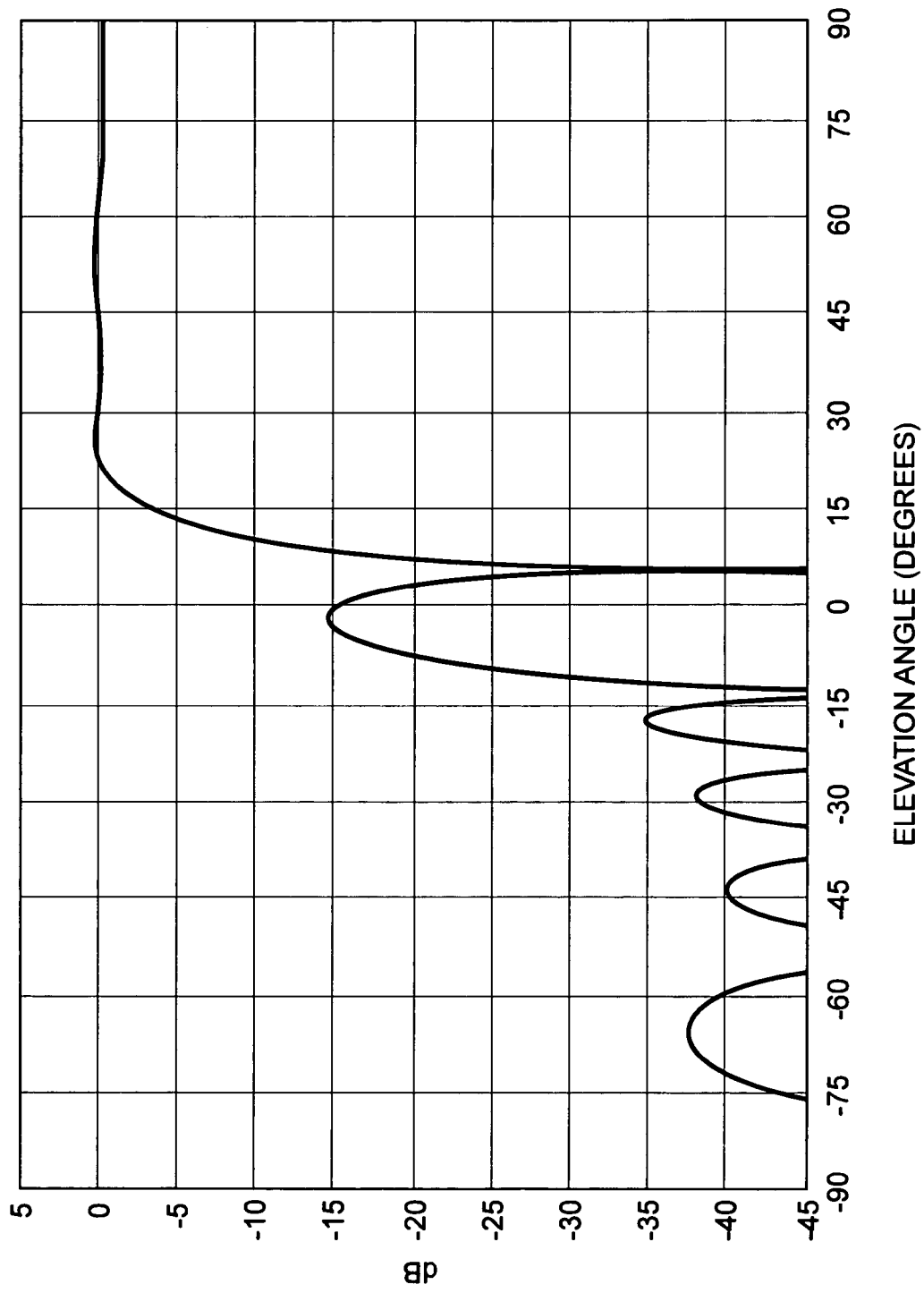
FIG. 9 is a graph representing a composite reception pattern for the antenna of FIG. 1 as a function of elevation angle, when the auxiliary beam output of FIG. 8 is subtracted from the reference beam output of FIG. 7 to obtain the reception pattern.

If the auxiliary beam 92 in FIG. 8 of the present application is used to null a jamming signal detected as occurring at five degrees elevation in the reference beam of FIG. 7, then a suitably adapted reception pattern for the inventive antenna 10 is illustrated in FIG. 9. Specifically, the auxiliary beam output of FIG. 8 is phased and weighted to match the signal received in the reference beam 90 of FIG. 7 at five degrees elevation, and then subtracted from the reference beam to obtain the antenna's reception pattern. Note the sharp elevation null at five degrees above the horizon in the reception pattern in FIG. 9.

Figure 10:
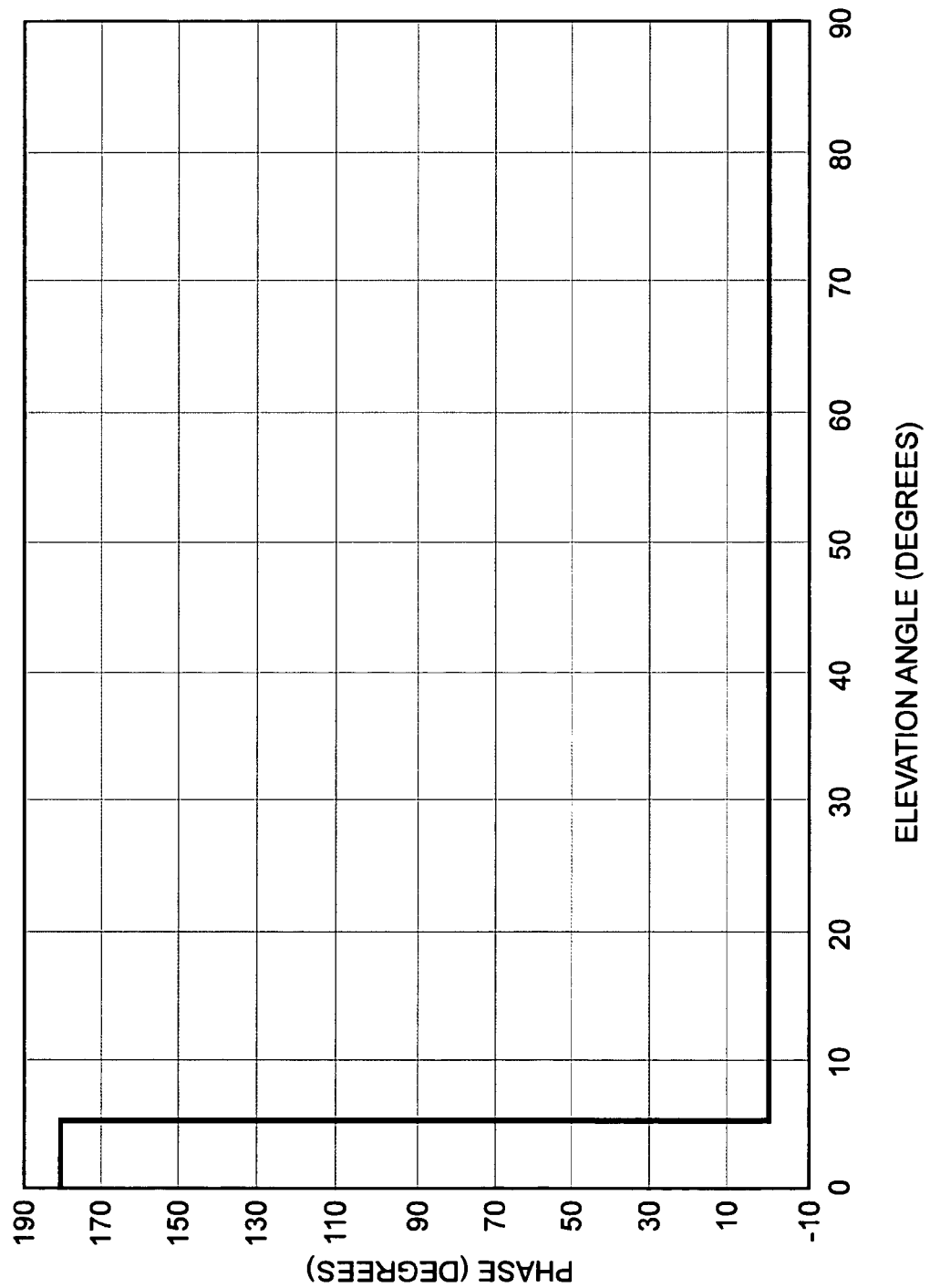
FIG. 10 is a graph representing relative carrier phase delay as a function of elevation angle, when the auxiliary beam output of FIG. 8 is subtracted from the reference beam output of FIG. 7 to obtain the reception pattern of FIG. 9.

Since the auxiliary beam of FIG. 8 has, e.g., a 30 dB sidelobe ratio, the required weighting and summation of the auxiliary beam with the reference beam to null the jamming signal at five degrees elevation, causes relatively little amplitude ripple in the main reference beam pattern. Nor does the auxiliary beam elevate the low elevation sidelobes of the antenna's reception pattern, as seen in FIG. 9, or cause excessive phase modulation, as seen in FIG. 10 which shows relative carrier phase delay introduced in the reception pattern as a function of elevation angle. Thus, the jamming signal is effectively eliminated without introducing significant navigation errors on GPS signals received by the antenna 10 at just slightly above the five degree elevation null angle.

As mentioned, the PPOL, the UPO and the CL power dividers 82, 84, 86 in FIG. 6 are each configured to produce their corresponding low-elevation auxiliary beams 94, 96, 98 by using, for example, a weighting and phasing arrangement similar to that disclosed in the '597 U.S. patent, but with only one beam output port.

In FIG. 6, one or more of the low-elevation auxiliary beams 92-98 are input to and adaptively combined with the reference beam 90 by the adaptive processor 110, to obtain an adapted reception pattern for the antenna 10 and provide a corresponding RF signal output to, e.g., a GPS receiver 112. The receiver 112 may be part of a DGPS 114 in which another processor compares a global position calculated by the receiver 112 with a known reference position and produces a corresponding error signal, and a transmitter sends the error signal wirelessly to an aircraft for landing approach guidance. Because the low elevation auxiliary beams are each derived from one of the mutually orthogonal pattern modes produced by the antenna units 16, the low-elevation auxiliary beams are themselves mutually orthogonal so that the reception pattern of antenna 10 can include multiple azimuthally independent nulls, each at a different azimuth angle within the vertical coverage regions of the low-elevation auxiliary beams.

Figure 11:
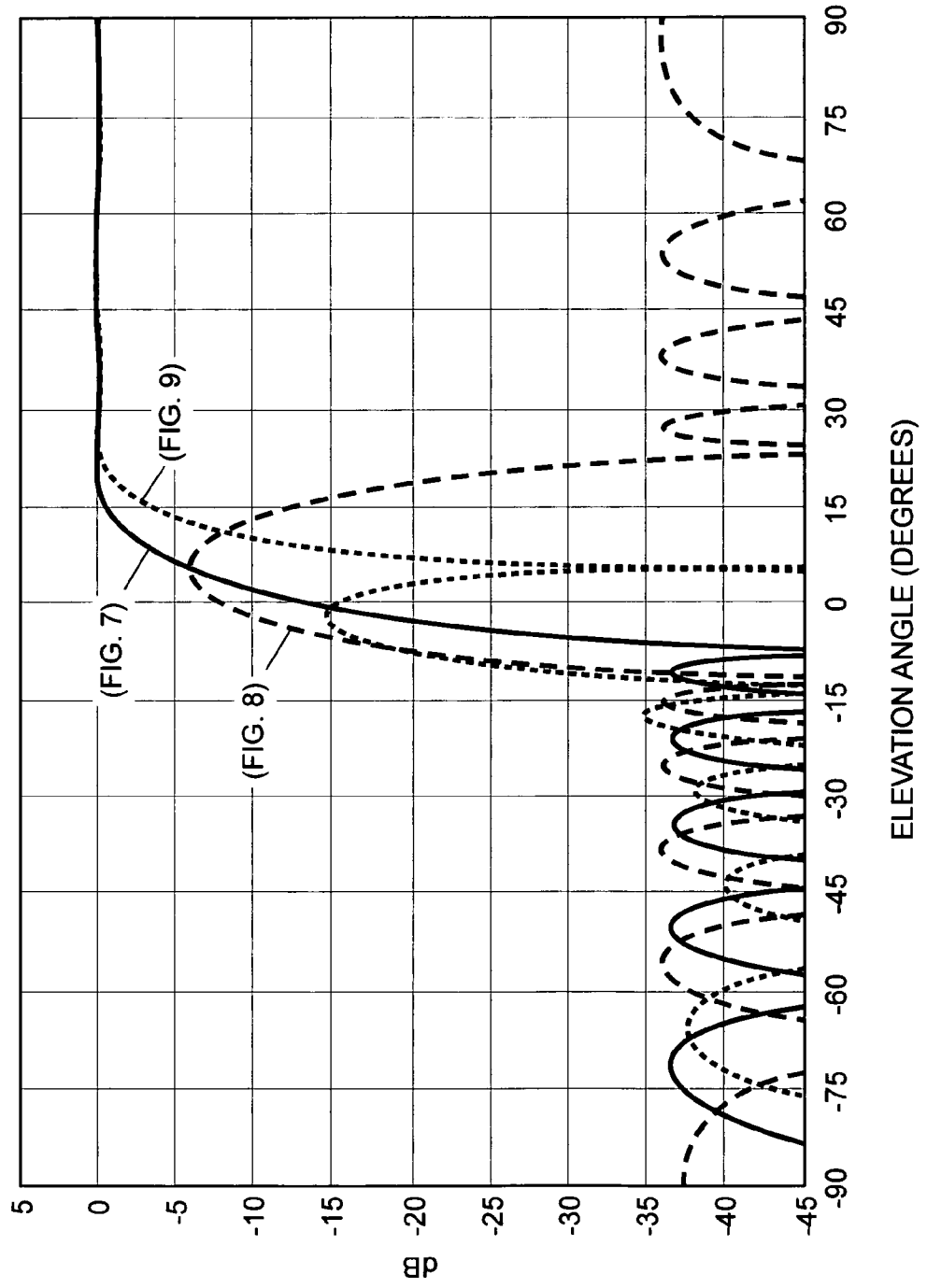
FIG. 11 is a graph showing how auxiliary beam gain and sidelobes affect null limitations and adapted sidelobe levels, as a function of elevation angle for the reception pattern of FIG. 9.

FIG. 11 is a graph showing null limitations, high elevation amplitude ripple, and adapted sidelobes impact, as a function of elevation angle. The auxiliary beams can only be used to null signals where the signal strength of the auxiliary beams is greater than that of the reference signal, when signal weights applied by the power dividers 80-86 are limited to a magnitude of one. Thus, it can be demonstrated that the auxiliary beams have a limited effective nulling region of between −12 and +7 degrees in elevation. This elevation nulling region can be adjusted by introducing a phasing into the beam formation which would steer this beam in elevation. It can be steered to the elevation considered most critical for the installation. The low elevation auxiliary beams have low sidelobes at higher elevations, thus limiting their impact in an adapted reception pattern since the sidelobes are 30 dB below the reference beam 90 at the higher elevations. Similarly, since the low sidelobes of the low elevation auxiliary beams at negative (below horizon) elevations have amplitudes in the order of the sidelobes of the reference beam 90 in that region, the sidelobes of the adapted reception pattern can grow by only approximately 3 dB.

Figure 12:
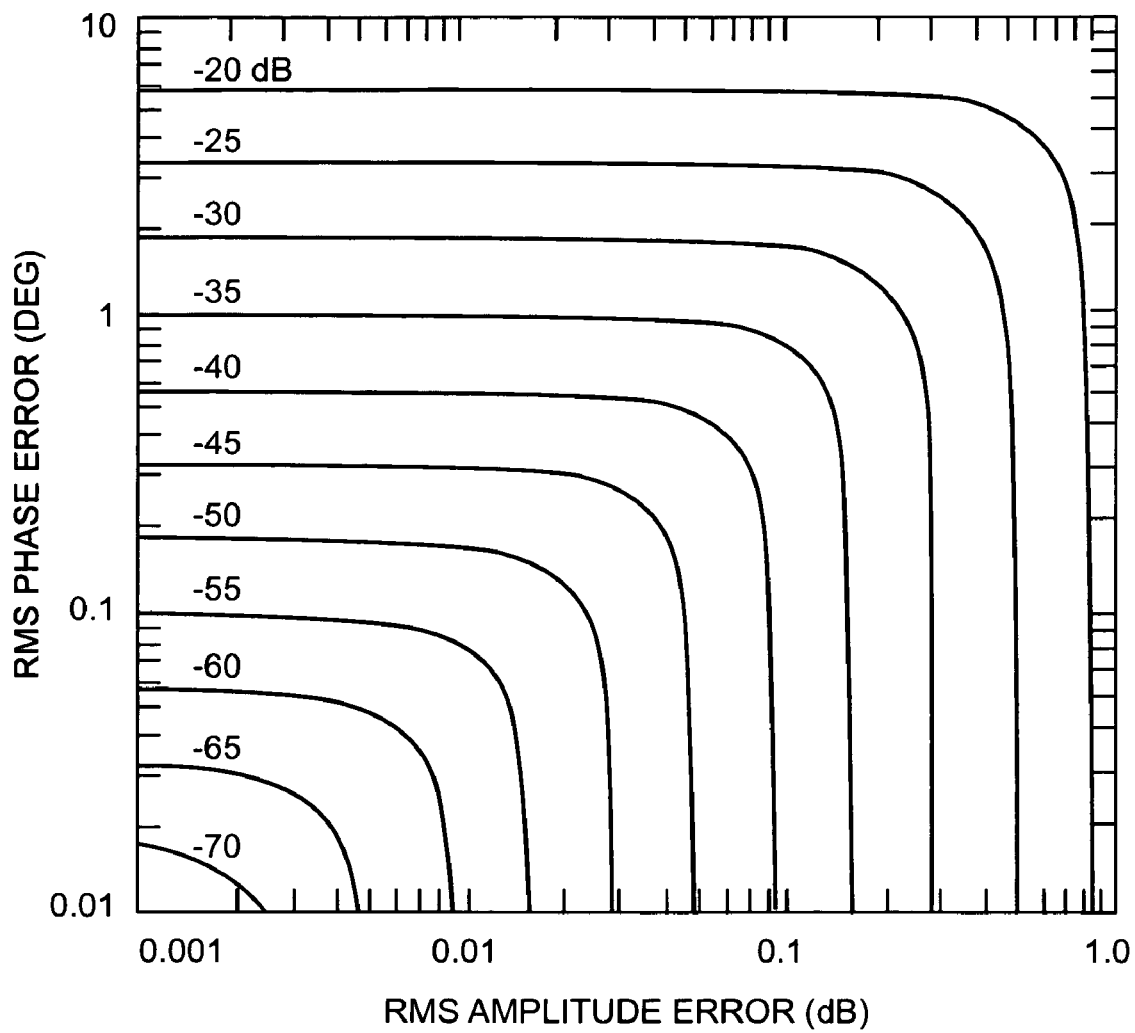
FIG. 12 is a graph showing phase and amplitude control precision needed to achieve a desired nulling performance in an adaptive array system.

FIG. 12 is a graph showing limitations in the null forming process when the rms phase and amplitude values of the reference and the auxiliary beams differ from those required for inserting a "perfect" null at a desired angle in the adapted reception pattern of the antenna 10. Actual nulls of from −20 dB to −70 dB, are depicted. The low elevation auxiliary beam 92, which is formed by the PPOR power divider 80, has the same phase progression as the reference beam 90 so that it will form a uniform null in elevation around a full 360 degrees in azimuth. The low elevation auxiliary beams 94, 96, 98 formed by power dividers 82, 84, 86 from the associated orthogonal pattern modes of the antenna units 16, have carrier phase progressions that differ from that of the reference beam 90 by one or two degrees in carrier phase per degree in azimuth. Therefore, although the processor 110 may operate to match selected auxiliary beams 94, 96, 98 with the reference beam 90 for complete nulling at a single azimuth angle, the selected beam(s) quickly lose their match with the primary beam 90 within a few degrees in azimuth at which the null is broken. Thus, sharp independent nulls can be obtained on multiple azimuth jamming signals, by adaptively combining the reference beam with an auxiliary beam whose carrier phase progression in azimuth differs from that of the reference beam.

FIG. 13 is a schematic diagram of a phasing or mode forming network (MFN) 100 that may form part of the eight-element antenna unit 80 of FIG. 4. Like the network 40 in FIG. 3, the MFN 100 includes 180 degree and 90 degree hybrid couplers, and a pair of 45 degree phase shifters, all connected as shown in the drawing. FIG. 14 is a table showing phase delays introduced by the MFN 100 to each of the eight antenna elements 84, 86, 88, 90, 92, 94, 96, 98 of the eight element antenna unit 80 (or its dipole equivalent) to produce eight mutually orthogonal pattern modes (labeled A to H in FIG. 13) for the unit 80.

Specifically, mode D corresponds to a 45-degree, progressive phase omnidirectional (PPO) right-hand circular polarized (RHCP) primary pattern mode for the antenna unit 80. The seven remaining modes correspond to auxiliary pattern modes that are available from the unit 80, as follows:

Mode A 135+ PPO RHCP
Mode B 45+ PPO LHCP
Mode C 135+ PPO LHCP
Mode E 90+ PPO LHCP
Mode F 90+ PPO RHCP
Mode G Eight lobe cloverleaf
Mode H Uniform phase omnidirectional The antenna 10 of FIG. 1 may also obtain high elevation angle nulling to suppress intentional jamming originating from, e.g., airborne platforms. It is especially important that reception of authentic GPS signals which also exist in this region not be impaired, for example, by introducing significant delays as a result of the nulling process.

Figure 15:
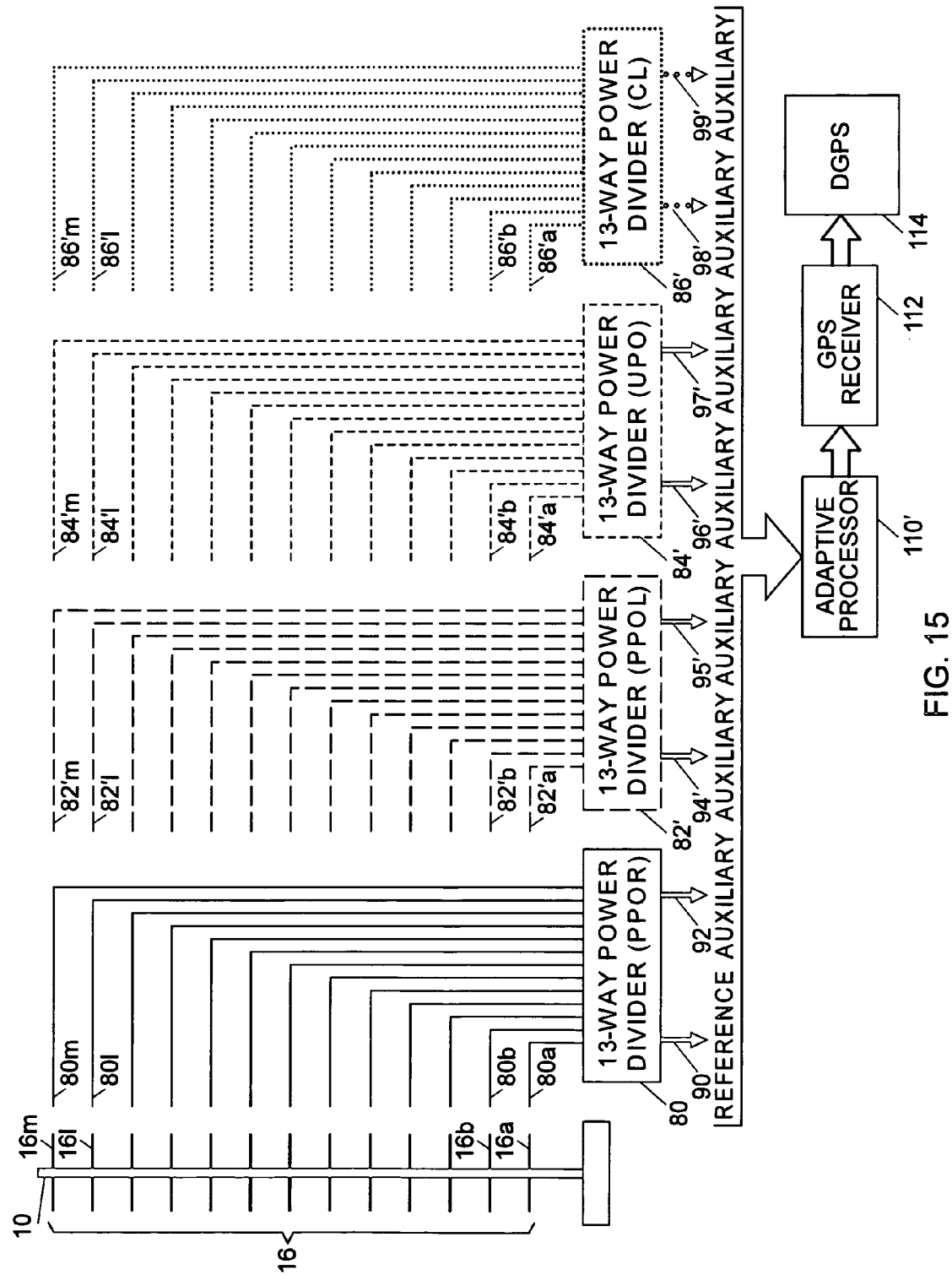
FIG. 15 is a block diagram showing a number of power dividers coupled to the antenna of FIG. 1 for obtaining multiple nulls in the reception pattern of the antenna, including nulls at higher angles of elevation.

A multiple elevation antenna nulling configuration is shown in FIG. 15. The configuration is capable of obtaining multiple nulls in an adapted, composite reception pattern of the antenna 10 at higher angles of elevation than may be obtained with the configuration of FIG. 6. Basically, three additional auxiliary beams are produced, one by each of the power dividers 82', 84', and 86'.

The reference beam 90 input to an adaptive processor 110' may be the same as in the FIG. 6 configuration. The additional auxiliary beams are formed to provide auxiliary beam patterns that have significant responses at higher elevation angles, but differ from one another in azimuthal carrier phase response so that independent azimuthal nulls may be adaptively formed at higher elevation angles. The adapted antenna reception pattern preferably maintains the property of having low downward looking sidelobes to reject ground multipath. The low elevation auxiliary beams 92, 94, 96, 98 obtained in the configuration of FIG. 6 may still be retained in the configuration of FIG. 15, so that the above described low elevation nulling can be performed simultaneously.

The inventive antenna system allows focused elevation and multiple azimuth nulling in particular threat regions, such as at low elevation, as well as at higher elevations. The nulling has minimal effect on the remainder of the spatial reception pattern of the antenna 10 outside of the nulling region. The nulls can be steered adaptively in azimuth over the region of the reference beam pattern, and may break sharply to recover antenna gain for reception of authentic GPS signals at the same elevation angle.

The configuration of FIG. 6 meets the threat of low elevation jammers located at or near the horizon, and the configuration of FIG. 15 is capable of nulling individual stand-off as well as air-borne jammers in azimuth, even without a large number of antenna units due to the different relative phase progressions of the orthogonal pattern modes of the units. The antenna 10 may be constructed so as to be sufficiently broadband to cover the GPS band with minimal distortion. The primary pattern modes of the antenna units are weighted and combined to provide a reference beam having uniform upper hemispheric RHCP coverage for the antenna, with a sharp horizon cutoff, multipath rejection. All of the pattern modes have common centers of carrier phase and group delay for precision position tracking.

While the foregoing represents preferred embodiments of the invention, those skilled in the art will understand that various modifications and changes may be made without departing from the spirit and scope of the invention, and that the invention includes all such modifications and changes within the scope of the following claims.

I claim:

1. An antenna system, comprising:
    a mast having an axis and arranged to be fixed at a certain position with respect to a surrounding ground area, and to extend vertically above the ground area;
    a number (N) of antenna units each including a base supported along the length of the mast with a determined spacing from one antenna unit to another antenna unit in the axial direction of the mast;
    each antenna unit includes a number of antenna elements mounted on and disposed about the periphery of the base of the unit for responding to radio frequency (RF) signals within a certain wavelength band, a number of mode ports on the antenna unit including a primary pattern mode port and one or more auxiliary pattern mode ports, and an associated phasing network disposed on or within the base of the antenna unit and coupled to the antenna elements on the base of the unit, wherein the phasing network is configured to produce a number (M) of mutually orthogonal antenna pattern modes including a primary pattern mode at the primary pattern mode port of the antenna unit, wherein the primary pattern mode corresponds to a desired signal response in the absence of an interfering signal incident on the antenna system, and one or more auxiliary pattern modes at corresponding ones of the auxiliary pattern mode ports of the antenna unit, wherein the auxiliary pattern modes have azimuthal RF carrier phase progressions that differ from one another and from that of the primary pattern mode;

M radio frequency (RF) power dividers each of which is associated with a different one of the M antenna pattern modes produced by the phasing networks of the N antenna units, wherein each power divider has N input ports each of which is coupled to the associated pattern mode port of a different one of the antenna units;

the input ports of a first power divider are coupled to the primary pattern mode ports of the antenna units, and the first power divider is configured to produce at least a corresponding primary or reference beam at a reference port of the divider, and, optionally, an auxiliary beam at an auxiliary port of the divider, and the input ports of second power dividers are coupled to the auxiliary pattern mode ports of the antenna units, wherein the second power dividers are configured to produce corresponding auxiliary beams at corresponding auxiliary ports of the dividers; and an adaptive processor coupled to the reference port of the first power divider and to the auxiliary ports of the first and the second power dividers, wherein the processor is configured to combine the reference beam and selected ones of the auxiliary beams produced by the dividers to obtain a reception pattern for the antenna system having one or more nulls at determined angles in both elevation and azimuth to suppress interfering signals arriving at the antenna system at said angles.

2. An antenna system according to claim 1, wherein the antenna units are each constructed and arranged substantially identical with one another, so that the reference and the auxiliary beams have approximately a common phase center and a common group delay center.

3. An antenna system according to claim 1, wherein the adaptive processor is configured to combine the reference and the auxiliary beams subtractively to produce multiple nulls in the reception pattern of the antenna system.

4. An antenna system according to claim 1, wherein the antenna elements of the antenna units are configured to respond to RF signals transmitted at a wavelength corresponding to signals used for global positioning or navigation.

5. An antenna system according to claim 4, wherein the signals are transmitted from GPS satellites.

6. An antenna system according to claim 1, wherein each of the antenna units has four or more antenna elements.

7. An antenna system according to claim 1, wherein the antenna elements of the antenna units comprise dipoles.

8. An antenna system according to claim 1, wherein the orthogonal pattern modes produced by the phasing network of each antenna unit are among those of a group comprising a progressive phase omni-directional (PPO) pattern, a uniform phase omnidirectional (UPO) pattern, and a clover leaf pattern.

9. An antenna system according to claim 1, wherein each of the antenna units has eight antenna elements, and the orthogonal pattern modes produced by the phasing network of each antenna unit are among those of a group comprising a 45 degree PPO pattern, a 90 degree PPO pattern, a 135 degree PPO pattern, a UPO pattern, and a clover leaf pattern.

10. A differential global positioning system (DGPS) including at least one antenna system according to claim 1, a GPS receiver coupled to the antenna system, a processing system coupled to the receiver and operative to compare a global position calculated by the receiver with a known reference position and to produce a resulting error signal, and a transmission system coupled to the processing system for transmitting the error signal to an aircraft for landing approach guidance.

11. A DGPS according to claim 10, wherein the surrounding ground area at which the mast structure of the antenna system is arranged to be fixed is in the vicinity of a ground airport runway.

12. A DGPS according to claim 10, wherein the surrounding ground area at which the mast structure of the antenna system is arranged to be fixed is in the vicinity of a landing zone on an aircraft carrier.

13. A collinear antenna array, comprising:
a mast having an axis and arranged to be fixed at a certain position with respect to a surrounding ground area, and to extend vertically above the ground area;
a number (N) of antenna units each including a base supported along the length of the mast with a determined spacing from one antenna unit to another antenna unit in the axial direction of the mast; and
each antenna unit includes a number of antenna elements mounted on and disposed about the periphery of the base of the unit for responding to radio frequency (RF) signals within a certain wavelength band, a number of mode ports on the antenna unit including a primary pattern mode port and one or more auxiliary pattern mode ports, and an associated phasing network disposed on or within the base of the antenna unit and coupled to the antenna elements on the base of the unit, wherein the phasing network is configured to produce a number (M) of mutually orthogonal antenna pattern modes including a primary pattern mode at the primary pattern mode port of the antenna unit, wherein the primary pattern mode corresponds to a desired signal response in the absence of an interfering signal incident on the antenna array, and one or more auxiliary pattern modes at corresponding ones of the auxiliary pattern mode ports of the antenna unit, wherein the auxiliary pattern modes have azimuthal RF carrier phase progressions that differ from one another and from that of the primary pattern mode.

14. An antenna array according to claim 13, wherein N is at least three.

15. An antenna array according to claim 13, wherein M is at least three.

16. An antenna array according to claim 13, wherein the antenna elements of the antenna units are configured to respond to RF signals transmitted at a wavelength corresponding to signals used for global positioning or navigation.

17. An antenna array according to claim 13, wherein each antenna unit has four or more identical antenna elements selected from the group comprising dipoles and monopoles, the antenna elements are disposed symmetrically about the periphery of the base of each unit, and the antenna elements of a given unit align with the antenna elements of a next adjacent unit on the mast in the direction of the mast axis.

18. An antenna array according to claim 13, wherein the antenna units are each constructed and arranged substantially identical with one another, so that the primary and the auxiliary pattern modes have approximately a common phase center and a common group delay center.

* * * * *